(No Model.) 3 Sheets—Sheet 1.

J. E. SHINN.
HAY RAKE AND LOADER.

No. 401,467. Patented Apr. 16, 1889.

Witnesses:
M. Fowler
E. G. Siggers

Inventor,
John E. Shinn

By his Attorneys (No Model.) 3 Sheets—Sheet 2.
J. E. SHINN.
HAY RAKE AND LOADER.
No. 401,467. Patented Apr. 16, 1889.
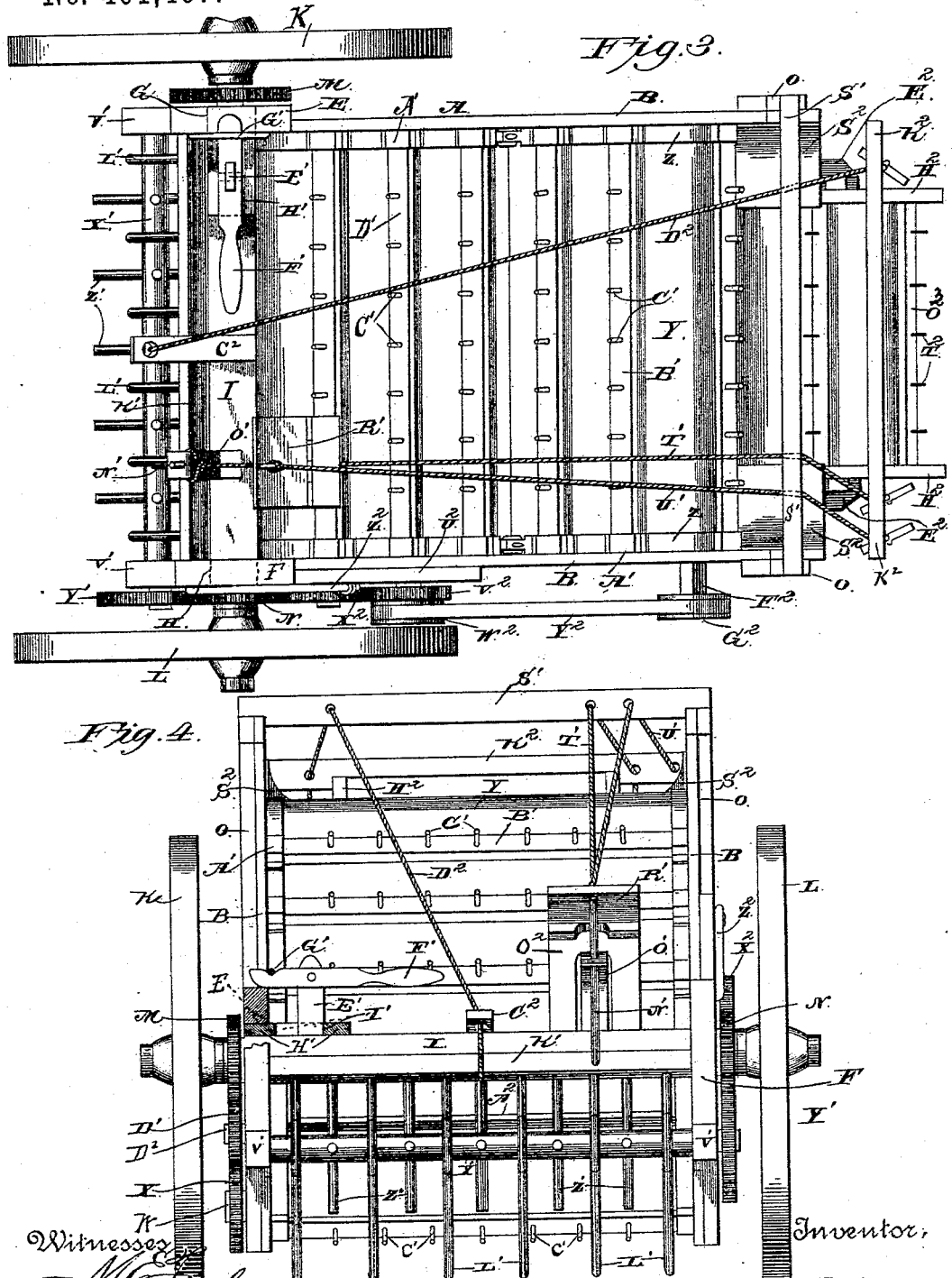

(No Model.) 3 Sheets—Sheet 3.
J. E. SHINN.
HAY RAKE AND LOADER.
No. 401,467. Patented Apr. 16, 1889.
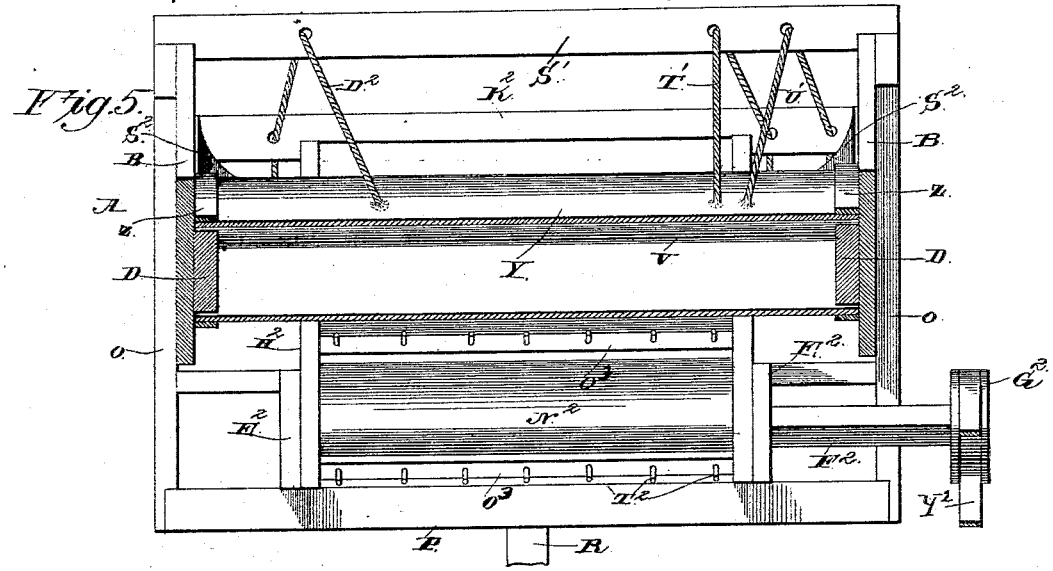
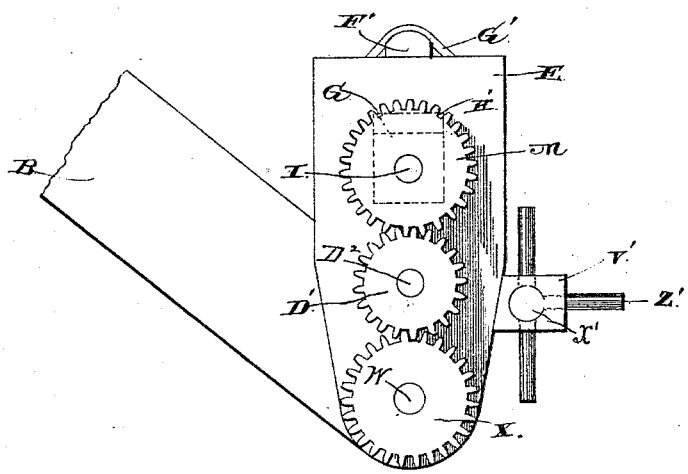
Witnesses
M. Fowler
E. L. Siggers
Inventor,
John E. Shinn
By his Attorneys

UNITED STATES PATENT OFFICE.

JOHN EDWARD SHINN, OF BRIDGMAN, MICHIGAN.

HAY RAKE AND LOADER.

SPECIFICATION forming part of Letters Patent No. 401,467, dated April 16, 1889.

Application filed April 16, 1888. Serial No. 270,812. (No model.)

*To all whom it may concern:*

Be it known that I, JOHN EDWARD SHINN, a citizen of the United States, residing at Bridgman, in the county of Berrien and State of Michigan, have invented a new and useful Improvement in Hay Rakes and Loaders, of which the following is a specification.

My invention relates to an improvement in hay rakes and loaders; and it consists in the peculiar construction and combination of devices, that will be more fully set forth hereinafter, and particularly pointed out in the claims.

Figure 1:
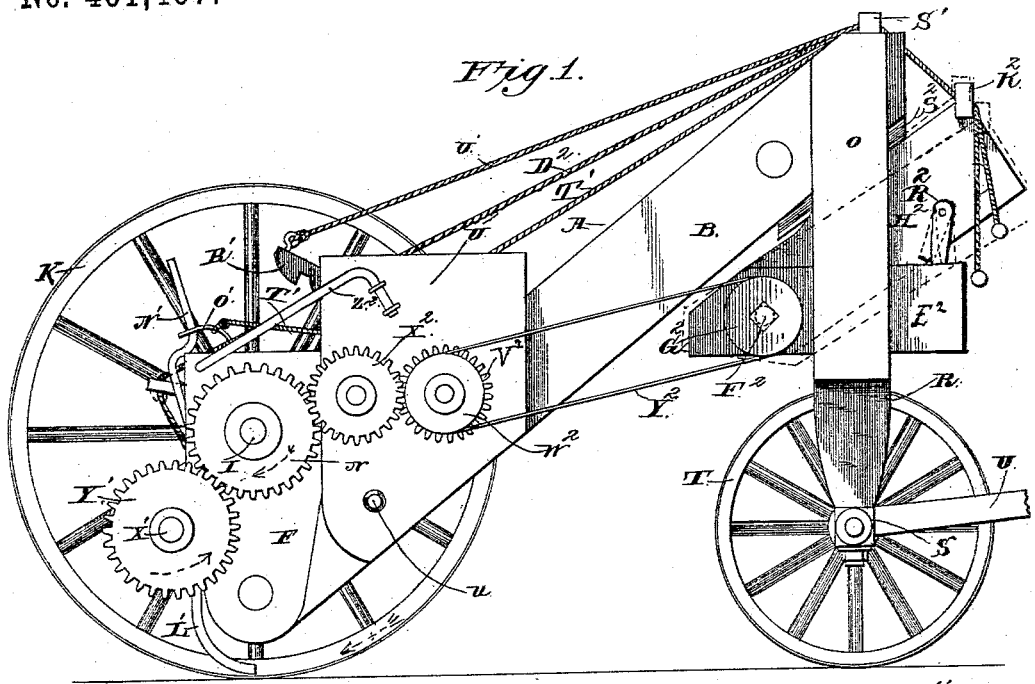
Figure 2:
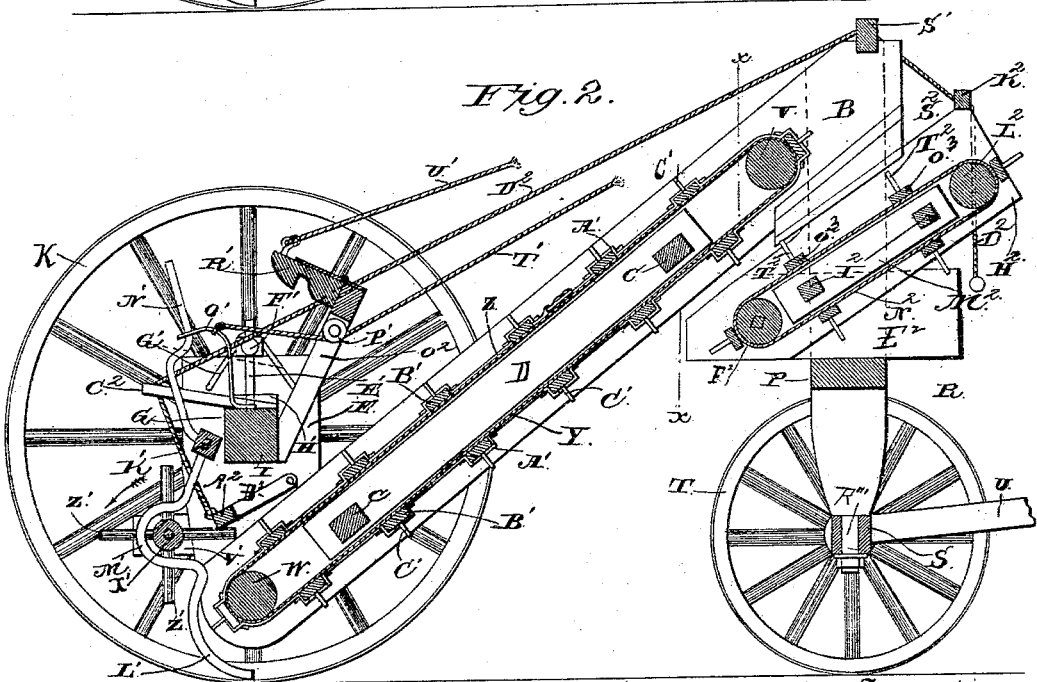

In the accompanying drawings, Figure 1 is a side elevation of a hay rake and loader embodying my improvements. Fig. 2 is a vertical longitudinal sectional view of the same. Fig. 3 is a top plan view of the same. Fig. 4 is a rear elevation thereof. Fig. 5 is a vertical transverse sectional view taken on the line $x\ x$ of Fig. 2. Fig. 6 is a detail side elevation of the gearing connecting the axle I with the lower roller of the elevator.

A represents the elevator-frame, which comprises the inclined side boards, B, and the transverse connecting-bars C.

D represents a pair of guides, which are secured to and arranged longitudinally on the inner side of the boards B. From the lower end of the elevator-frame, at opposite sides thereof, projects a pair of vertical standards, E F. The said standard E has a vertical slot, G, near its upper end, and standard F has an opening, H, near its upper end.

I represents an axle, which extends through the opening H and the slot G, and is provided at its ends with projecting spindles, on which are journaled driving and supporting wheels K L. To the inner side of the wheel K, at the center of the same, is secured a spur-wheel, M, and to the inner side of the wheel L, at the center of the same, is secured a spur-wheel, N.

O represents a pair of vertical standards, which depend from the upper end of the elevator-frame and have their lower ends connected by a cross-bar, P. A knee, R, is arranged on the under side of said cross-bar at the center thereof, and an axle, S, is centrally pivoted to the said knee by means of a king-bolt, R'''.

T represents a pair of supporting-wheels, which are journaled on the ends of axle S and form the supports for the front end of the machine. Said wheels T are considerably smaller than the wheels K L, and are adapted to run under the elevator-frame when the front axle is turned, thereby enabling the machine to be turned in a contracted space.

U represents a tongue, which is secured to the front axle in the usual manner, and by means of which the machine may be connected to a hay-wagon and caused to operate in rear thereof when the wagon is drawn across a field.

V represents a roller which is journaled in the sides of the elevator-frame near the upper end thereof, and W represents a roller which is journaled in the sides of the elevator-frame at the lower end thereof, and also in the standards E F. To one end of the said roller W, which projects beyond the outside of the standard E, is keyed a gear-wheel, X.

Y represents an endless elevating-belt, which connects the rollers V and W, and is provided at its sides with re-enforcing belts or straps Z, the meeting ends of which are buckled together, as shown. By means of these straps the elevating-belt may be stretched to cause it to exert the requisite friction on the rollers V W. On the outer side of the said strap, at suitable regular distances apart, are secured keepers A', in which are inserted the ends of a series of transverse bars, B'. The said bars are provided with teeth or spurs C', which project from their outer sides.

D' represents a gear-wheel, which is journaled on a spindle, $D^2$, that projects from the outer side of the standard E and meshes with the wheel X.

E' represents a standard, which projects from the upper side of the axle I. Near the upper end of the said standard is fulcrumed a lever, F', the outer end of which is connected by means of a link or yoke, G', to the standard E. By reason of the said standard E having the slot G, through which one end of the axle I extends, the said standard is adapted to be raised and lowered on the axle by the lever F', as will be readily understood.

H' represents a plate or key, which is arranged on the upper side of the axle I, and is provided with a longitudinal slot, I', through which the standard E' extends, the said plate or key being thereby guided by the said standard.

When the inner end of the lever F' is depressed, so as to raise the standard E, the wheel D' is caused to engage the wheel M, and thereby gear the actuating-roller W of the endless elevating-belt to the wheel K, as will be readily understood, and the said standard E is secured in this elevated position by moving the plate or key H' outward, so that the outer end thereof enters the upper end of the slot G above the axle I and prevents the standard from being lowered, thereby keeping the endless elevator geared to the wheel K.

K' represents a rake-head, which is journaled in the standards E F and arranged in rear of the axle I. From the said rake-head projects a series of rake teeth or tines, L', each of which is bent in the form here shown, has its rear end curved downward and forward, and is provided near its upper end with a curved offset, M'.

N' represents an arm, which projects from the rake-head at a suitable angle.

O' represents a spring-link, which is secured to the axle I and bears against and is connected to the arm N'. From the front side of the axle, near one end thereof, projects a forwardly-inclined and upwardly-extending standard, $O^2$, in which is journaled a suitable guiding-sheave, P'. To the upper end of said standard is hinged a rearward-extending pawl, R', which is adapted to engage the upper end of the arm N', so as to secure the rake in position when the rear ends of its arms or tines are raised from the ground.

S' represents a cross-bar, which connects the sides of the elevator-frame at the upper end thereof.

T' represents a cord, which is attached to the spring-link O', passes under the guiding-sheave P' in the standard $O^2$, and passes through an opening in the bar S'.

U' represents a similar cord, which is attached to the free end of the pawl, and passes also through an opening in the bar S'.

From the rear sides of the standards E F, near the lower ends thereof, project horizontal arms or brackets V', in which is journaled a shaft, X', which is provided at one end with a gear-wheel, Y', that meshes with the wheel N on the wheel L, and is thereby adapted to be rotated when the machine is in motion, as will be readily understood. From the said shaft X' project a series of radial arms or fingers, Z', which are adapted to pass between the tines or teeth of the rake, and are caused to turn in the direction indicated by the arrow in Fig. 2 when the machine is in motion, so that their lower ends move in the same direction with the opposing upper side of the elevating belt or apron.

$A^2$ represents a bar, which is provided at its ends with right-angled arms $B^2$. The said arms are arranged on the inner side of the standards E F, and have their upper ends pivoted to the said standards, and thereby the said bar $A^2$ is adapted to be swung or moved upward or downward. The said bar $A^2$ and the said arms $B^2$ constitute a clearer, which is adapted to clear the hay from the teeth of the rotating feeder X' Z' and cause the hay to drop onto the lower end of the elevator belt or apron. When the arm N' is disengaged by the pawl R', the gravity of the rake teeth or tines causes the rake-head K' to partly rotate, so as to lower the rear end of the rake teeth or tines to the ground, and as the machine advances the said rake teeth or tines gather the hay from the ground, and the hay thus gathered by the rake-teeth is caught by the teeth of the revolving feeder X' Z' and carried forward to the rear end of the elevating belt or apron Y, as before stated. The bar $A^2$ of the fender normally rests upon the teeth of the rotating feeder and drops by its own gravity from one set of teeth to the next succeeding set as the feeder X' Z' continues to revolve. By reason of the fender or clearer being pivoted, the same is caused to yield as the hay is pressed under it, so as to offer as little resistance as possible to the rotation of the feeder, and hence enabling the machine to be operated by a minimum amount of power.

$C^2$ represents an arm, which projects rearward from the axle I. A cord, $D^2$, is attached to the clearer-bar $A^2$, passes through an opening or around a sheave in the arm $C^2$, and from thence passes upward and forward through an opening in the bar S'. By means of this cord the fender may be raised out of the path of the revolving teeth of the feeder, so as to cause the said fender to cease to operate.

$E^2$ represents a pair of arms or side plates, which are secured on the upper side of the front cross-bar, P, and project rearward therefrom.

$F^2$ represents a shaft, which is journaled in bearings in the rear end of the arms or plates $E^2$, and has its central portion enlarged to form a roller. One end of the said shaft is provided with a pulley, $G^2$.

$H^2$ represents the sides of a conveyer-frame, which are connected by cross-bars $I^2$, and have their rear ends pivoted on the roller or shaft $F^2$. A cross-bar, $K^2$, connects the front upper corner of the said conveyer-frame, and has its ends projecting beyond the sides of the said frame and provided with openings, through which the operating-cords U', T', and $D^2$, hereinbefore described, are passed, the pendent ends of the said operating-cords being provided with suitable handles, which are adapted to be readily grasped by the operator.

$L^2$ represents a roller, which has its ends journaled in the sides $H^2$ of the conveyer-frame, as shown. On the inner sides of the sides $H^2$ are longitudinal guides $M^2$, which are similar to the guides D of the elevator-frame.

$N^2$ represents an endless conveying-apron, which connects the roller L² and the roller on the shaft F², and the said conveying-apron is provided on its outer side with a series of transverse slats or cleats, O³, each of which is provided with a series of spurs or teeth, T², that project beyond its outer side. The rear end of the conveyer is arranged under the front upper end of the elevator, and thereby the hay will be carried upward by the said elevator and is caused to drop therefrom onto the conveyer. The sides H² of the latter being pivoted or hinged to the shaft F², said conveyer is adapted to be inclined to any desired angle, and the said conveyer is provided with supporting-legs R², which are pivoted at their upper ends and are adapted to bear upon the upper sides of the plates E², so as to support the front end of the conveyer when the latter is arranged in inclined position. (Shown in Figs. 1 and 2.) By inclining the legs R² the upper end of the conveyer may be lowered, if necessary, according to the height of the wagon on which the hay is to be loaded. The width of the said conveyer is considerably less than the width of the elevator, and the latter is provided at its upper end with a pair of inwardly-extending downwardly-inclined deflecting-plates, S², which are secured to the sides B and are adapted to discharge the hay onto the conveyer. The function of the said conveyer is to discharge the hay which is fed thereto by the elevator onto the wagon, behind which the hay-rake and loader is trailed, as before stated.

U² represents a plate, which is rectangular in shape, and has its lower edge inclined, as shown, to be flush with the lower edge of the sides of the elevator, and which is pivoted on a spindle, $u$, that projects from one side of the elevator-frame. On a projecting spindle which extends from the outer side of this lever is journaled a gear-wheel, V², on the outer side of which is a pulley, W².

X² represents a gear-wheel, which is also journaled on a spindle that projects from the lever U² and meshes with the wheel V². An endless belt, Y², connects the pulley W² with the pulley G². The lever U², when the same is turned rearward on its pivotal bolt or spindle, causes the wheel X² to mesh with the gear-wheel N, and thereby impart the rotary motion of the said gear-wheel to the wheels X² and V², and tightens the belt Y², so as to cause the same to transmit the motion of the pulley W² to the pulley G², and consequently operate the conveyer-belt N².

Z² represents a hook or detent, which is pivoted to the standard F, and is adapted to engage keepers or notches in the lever U², so as to retain the latter when the same is in the position hereinbefore stated.

Having thus described my invention, I claim—

1. The combination, in a hay rake and loader, of the elevator-frame having the standards E F at its rear end, the rear axle, I, having the driving-wheels, one of which is provided with a gear-wheel, M, the endless elevator arranged in the elevator-frame and having one of its rollers provided with the gear-wheel X outside of the standard E, the wheel D', journaled to the standard E on the outside and meshing with the wheel X, and the lever to raise the said standard, thereby to throw said wheel D' into engagement with the wheel M to revolve the endless elevator, substantially as described.

2. The combination, in a hay rake and loader, of the elevator-frame having the standards E F at its rear end, the axle I, from which said frame is suspended by the said standards, the standard E having the vertical slot in its upper end and being thereby adapted to move vertically about the axle, the supporting-wheels journaled to the axle, one of said wheels being provided with the wheel M, the endless elevator having one of its rollers provided with the gear-wheel X, the gear-wheel D', journaled on standard E and engaging wheel X, the lever to raise the standard E and cause wheel D' to engage wheel M, and the plate or key adapted to enter between the upper end of the slot in standard E and the axle I, substantially as described.

3. The combination, in a hay rake and loader, of the rear axle having the supporting-wheels, one of which is provided with gear-wheel M, the elevating-frame having its rear end suspended from the said axle and adapted on one side to be raised and lowered, the endless elevator in the said frame, and the gears to operate the said elevator journaled in the elevator-frame and adapted to engage the wheel M when the elevator-frame is raised and to be disengaged when lowered, substantially as described.

4. The combination of the elevator-frame, the rear axle, I, having the supporting-wheels, one of which has the wheel N, the conveyer arranged at the front end of the elevator and having the operating-pulley G², the plate U², pivoted to one side of the frame, the geared wheels V² and X², mounted on the said plate, one of said wheels being adapted to engage the wheel N, the pulley W², secured to the wheel V², and the endless belt Y², connecting said pulley to the pulley G², substantially as described.

5. The combination, in a hay rake and loader, of the endless elevator, the rake at the rear end thereof, the revolving shaft X', having the radial arms or teeth arranged between the rake teeth or tines, and the fender-bar A², having the pivoted arms B² and bearing on the teeth of the revolving shaft in succession, substantially as described.

In testimony that I claim the foregoing as my own I have hereto affixed my signature in presence of two witnesses.

JOHN EDWARD SHINN.

Witnesses:
ROSCOE D. DIX,
WILLIAM J. JONES.